Oct. 27, 1942.   J. E. KENNEDY   2,299,825
TUBE MILL
Filed July 22, 1940   2 Sheets-Sheet 2
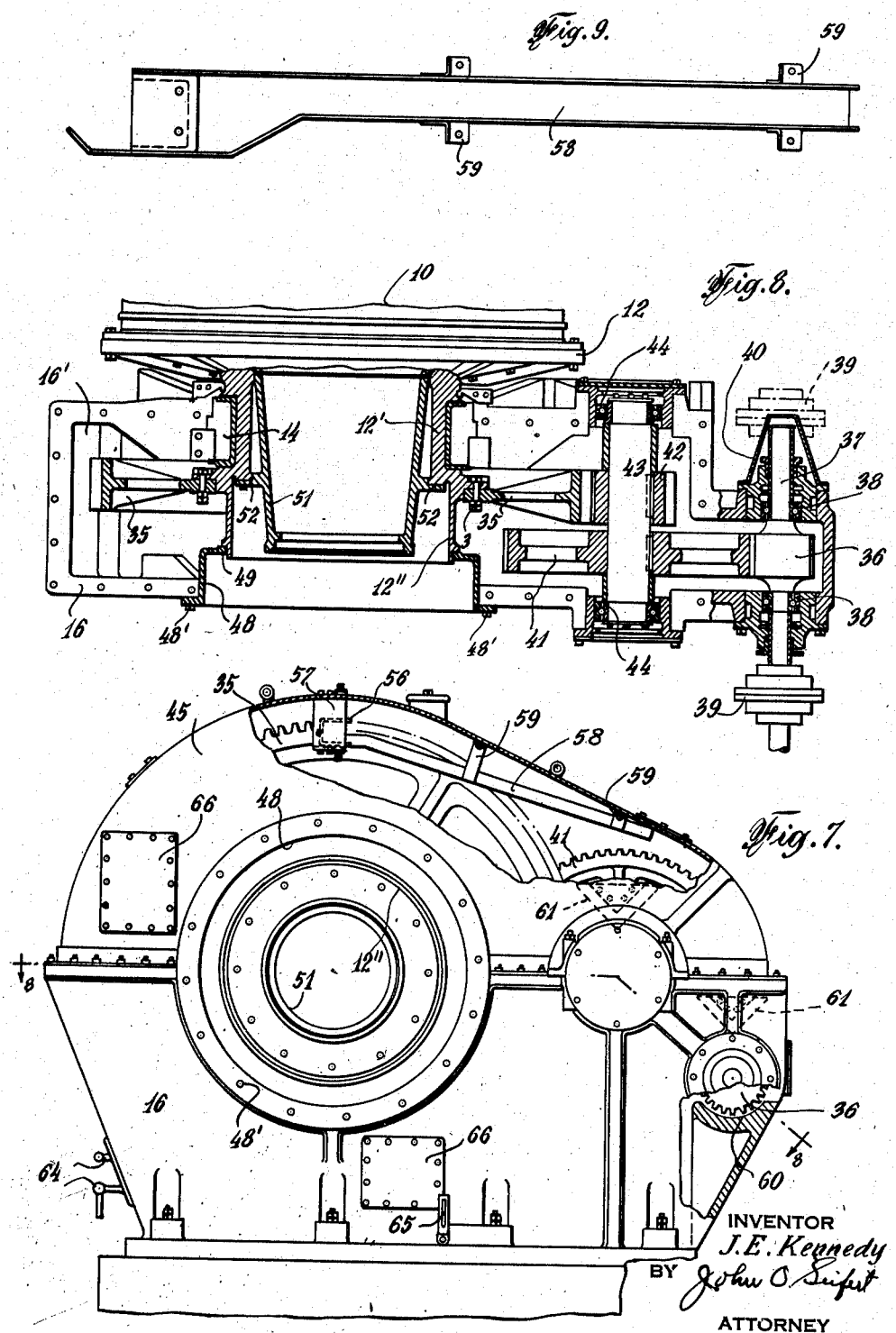
INVENTOR
J. E. Kennedy
BY John O. Seifert
ATTORNEY Patented Oct. 27, 1942

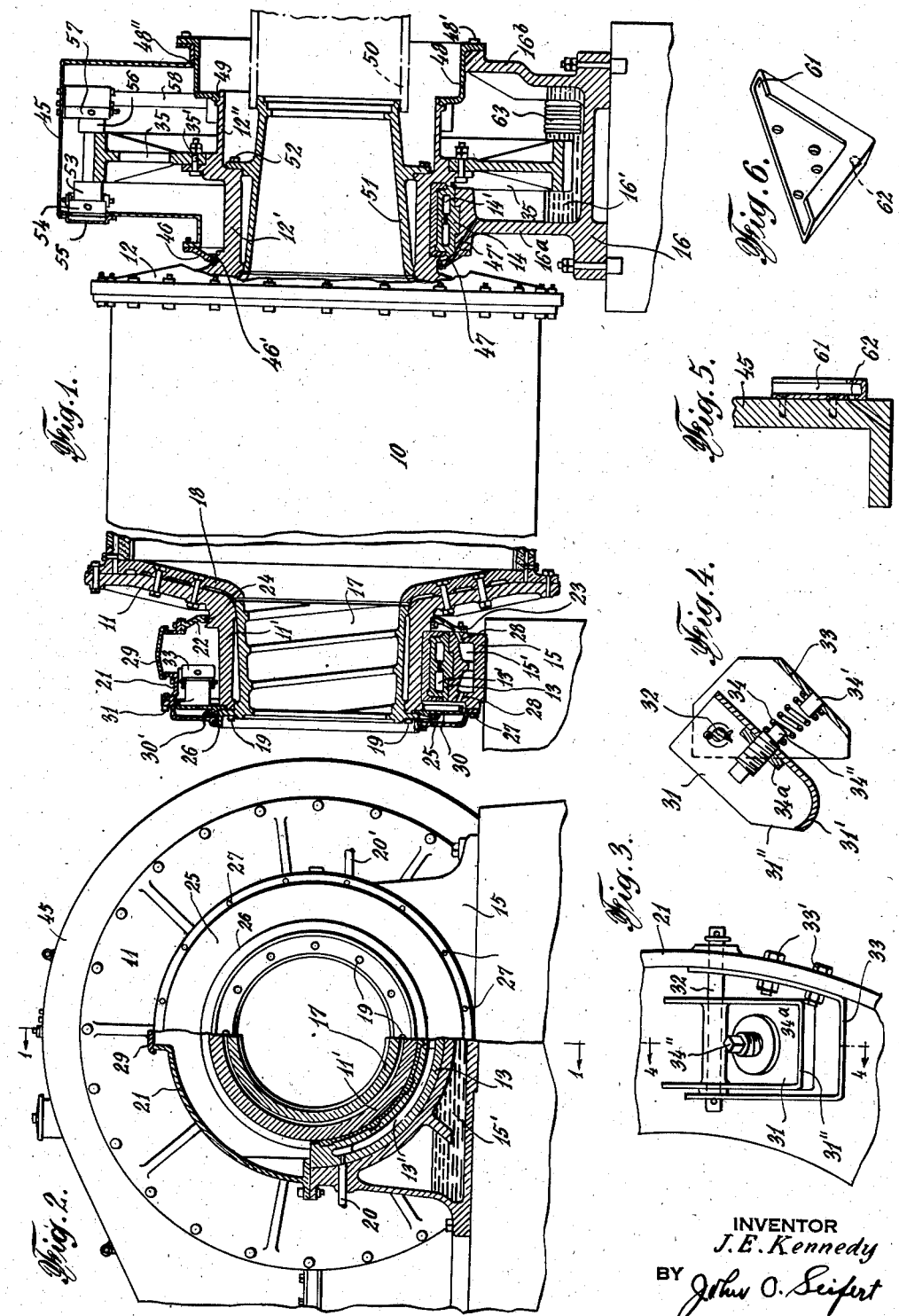

2,299,825

UNITED STATES PATENT OFFICE 2,299,825

TUBE MILL

Joseph E. Kennedy, New York, N. Y., assignor to Kennedy-Van Saun Mfg. & Eng. Corporation, New York, N. Y., a corporation of Delaware Application July 22, 1940, Serial No. 346,859

5 Claims. (Cl. 184—11)

This invention relates to tube and the like mills including a horizontal axis drum having hollow trunnions axially at the opposite ends to rotatably support the drum in bearings in supports for the drum. The material to be reduced is fed into the drum through one of the trunnions and is reduced in the drum as it is rotated by the impact and the attrition action of freely moving elements therein, the reduced material therein being delivered from the drum through one of the drum trunnions in suspension in an air stream.

It is the principal object of the invention to provide improved driven means to rotate the drum including a driving gear fixed concentrically of the drum trunnion and rotatable with the drum and intermediate gears to operatively connect and rotate the driven gear and thereby the drum from a driving gear, and the provision of improved means to automatically lubricate said drum trunnion and the trunnion bearing as well as the gears and bearings therefor.

Another object of the invention relates to a tube mill of this character wherein the drum is rotated through a gear concentric of a drum trunnion from a driving gear through intermediate gearing operatively connecting the driving and driven gears, and the provision of an improved support for the drum having a bearing to be engaged by the drum trunnion and a lubricant carrying well and rotatably supporting the driving and intermediate gears and a peripheral portion of the driven gear engaging at all times in the lubricant in the well and operative by the rotation thereof and surface contact of the lubricant therewith to elevate the lubricant from the well to above the axis of rotation thereof, and means to sweep lubricant from the gear and distribute it over said trunnion and trunnion bearing and onto the gears and bearings therefor, and to provide a hood to engage over the trunnion and gears co-operating with the drum and gear support to form a lubricant carrying housing, and said support and hood arranged for the passage of a conduit connected to the drum trunnion through which to deliver material in suspension in an air stream from the drum.

In tube mills of this character difficulty is experienced in applying lubricant to the drum trunnions and the bearings in the drum support with the result that the trunnions and bearings are quickly worn, and it is an object of the invention to provide improved means in tube mills to automatically supply lubricant to the trunnions and the trunnion bearings, comprising the provision of a well in the supports for the trunnion bearings adapted to contain lubricant with means fixed on the trunnions participating in the rotation of the drum having a peripheral portion at all times engaging in the lubricant in said well, and said means being adapted to elevate lubricant from the well by the surface contact and adhesion of lubricant therewith to above the axis of the trunnions and the provision of means to sweep the lubricant from said lubricant elevating means and direct it onto the trunnions and trunnion bearings.

It is another object of the invention to provide improved supports for tube mills arranged with a well adapted to contain lubricant and a bearing in the supports for engagement of the drum trunnions arranged with a chamber having an inlet and an outlet adapted to connect the chamber in the bearing with a source of and circulate a cooling medium through the bearing chamber, and the provision of means to elevate lubricant from the well in the supports and distribute it over the drum trunnions and the trunnion bearings.

In the drawings accompanying and forming a part of this application, Figure 1 is a side elevation of a drum of a tube mill, partly in section, and showing an embodiment of the bearing supports for the drum trunnions arranged with lubricant carrying wells with hoods engaging over the trunnions co-operating with the supports to form lubricant carrying housings and to show the means to elevate the lubricant from and distribute it over the drum trunnions and trunnion bearings.

Figure 2 is an end elevation, partly in section, looking at the left in Figure 1.

Figure 3 is an elevational view of a sweep and its mounting for sweeping lubricant from elements rotatable with the drum for elevating lubricant from the wells in the bearing supports and to distribute the lubricant over the drum trunnions and trunnion bearings.

Figure 4 is a sectional view taken on the line 4—4 of Figure 3.

Figure 5 is a cross sectional view of a portion of one of the bearing supports relative to the bearings of a driving and intermediate gears for rotating the drum and showing a lubricant receiving trough mounted thereon.

Figure 6 is a perspective view of the lubricant receiving trough shown in Figure 5.

Figure 7 is an end elevation looking at the right of Figure 1 and partly in section to show the means for distributing the lubricant swept from the driven gear onto the driving and intermediate gears.

Figure 8 is a sectional view taken on the line 8—8 of Figure 7; and

Figure 9 is a plan view of means for receiving lubricant swept from the driven gear and to distribute said lubricant onto the driving and intermediate gears.

An embodiment of the invention is shown in connection with the drum of a tube mill of usual construction including a cylindrical body 10 having heads 11, 12 secured to the ends, each head having an axial hollow trunnion 11', 12' extending laterally therefrom and whereby the drum is rotatably supported in bearings 13, 14 with an interposed bearing metal, the bearings being mounted in supports 15, 16 for the drum mounted upon a suitable foundation, such as reinforced concrete. A sleeve 17 is engaged in the trunnion 11' with the inner end abutting an annular lining member 18 of wear resisting material disposed relative to the inner face of the head 11 and the sleeve is secured in the trunnion by lag screws extended through openings in a laterally extended annular flange at the outer end of the sleeve and having threaded connection with openings in the end of the trunnion, as at 19. The bearing 13 is of semicircular form and is mounted in a correspondingly formed recess in the top of the support 15. The bearing has a chamber 13' therein adapted to contain a cooling medium, such as water, and has an inlet and an outlet adapted for the connection of tubes thereto, as at 20 and 20', connected to a source of and means (not shown) for circulating the cooling medium through the bearing chamber.

The drum support 15 is arranged with a well 15' to contain lubricant. A hood engaged over the trunnion 11 is fixed to and co-operates with said support 15 to provide a lubricant carrying housing, and comprises a semicircular member 21 engaged over and spaced from the top of the trunnion. An annular member 22 is secured at a peripheral portion to one end of the hood member 21 and has a peripheral portion disposed at and secured to the inner end of the support, as at 23. One peripheral edge of said plate 22 bears on the trunnion with an interposed packing providing a liquid tight bearing on the trunnion, as at 24, and an annular plate 25 also bears at the inner edge upon the trunnion with an interposed packing material to provide a liquid tight bearing, as at 26, and is connected at a peripheral portion to the outer end of the hood member 21 and has a peripheral portion disposed at and secured at the outer end of the support, as at 29. By the connection of the plates 22 and 25 to the opposite ends of the bearing support 15 the lower portion of the housing constitutes a lubricant carrying well in communication with the well 15' in the support 15 through ports 28. The hood member 21 has an access opening above the trunnion closed by a removable closure, as at 29.

The lubricant in the well in the support 15 is utilized for lubricating the drum trunnion 11' and its bearing 13. To elevate the lubricant from said well to above the axis of the trunnion and distribute it over the trunnion onto the trunnion bearing, an annular plate 30 is secured to the trunnion to extend laterally therefrom by engaging the same upon the trunnion sleeve 17 and clamping it between the end of the trunnion and the sleeve flange 19, the plate having an annular peripheral flange extending inwardly in a direction toward the trunnion. The plate 30 is of a diameter so that a peripheral portion will at all times be engaged in the lubricant in the well of the housing. The lubricant is elevated from said well by the rotation of said plate and the surface contact of the lubricant with the plate, the lubricant adhering to the plate and being swept off from the plate above the axis of the trunnion and distributed over the trunnion and bearing by a sweep, comprising, as shown in Figures 3 and 4, a member having a body 31 of channel shape in cross section closed at the forward end, as at 31', with the side walls of the channel at said end cut away to incline from a point within to the closed end of said member, as at 31'', and constituting the portion of the sweep contacting the surface of the plate 30. The sweep 31 is loosely supported on a pin 32 to have pivotal movement in a channel bracket 33 fixed at one of the side walls thereof upon the hood 21 to depend therefrom by lag screws, as shown at 33' in Figure 3, with the channel in said bracket opposed to the annular plate 30, as shown in Figure 1, the sweep supporting pin 32 being supported at one end in the hood member. The sweep is urged into engagement with the plate 30 by a coiled spring 34 interposed between the leg connecting portions of the sweep and bracket, as shown in Figure 4, the spring being held against displacement by engaging one end of the spring upon a pin 34' fixed in the bracket 33, and engaging the opposite end upon a pin 34'' threaded into an opening in the portion connecting the side walls of the sweep and locked therein by a lock nut 34a. The sweep 31, as shown in Figure 1, is supported to have pivotal movement on a vertical axis and urged to position with the inclined edge 31'' engaging with the plate 30, the open end of the sweep opening to within the end of the trunnion whereby the lubricant swept from the plate 30 will flow inwardly of the sweep through the open end over the trunnion onto the trunnion bearing 13 providing a continuous supply of lubricant thereto during the operation of the mill. The plate 30 is provided with a flange 30' on the outer surface of the plate, said flange being disposed adjacent the mounting of the plate on the trunnion 11' and extending at an acute angle to the plate thereby providing an annular pocket adapted to receive lubricant adhering to and flowing down the portion of said plate 30 above the axis of the trunnion and cause it to be emptied into the lubricant well and preventing an excess quantity of the lubricant being directed onto the bearing of the plate 25 on the trunnion sleeve 17.

The opposite end of the drum is rotatably supported by the trunnion 12' in the bearing 14 also of semicircular form mounted in a correspondingly formed recess in the top of the inner wall 16a of the support 16, the support having a chamber 16' therein open at the top and constituting a liquid carrying well. The bearing 14 is provided with a chamber 14' similar to the bearing 13, said chamber having an inlet and an outlet for connection of means to circulate a cooling medium therethrough.

The drum is rotated by a driven gear 35 fixed to the drum concentrically thereof, and shown as mounted on and secured by screws to an annular flange extending laterally from the drum trunnion 12', as shown at 35', with a peripheral portion of the gear engaging in the lubricant in the chamber in the support 16. The gear 35 is driven by a driving gear 36 fixed on a shaft 37 journaled in bearings 38 arranged with a stuffing box in the opposite end walls of the support 16 with the gear rotating in the chamber 16' in said support. The gear 36 is adapted to be operatively connected to a suitable source of power (not shown) by means of a coupling 39 adapted to be fixed upon one end of the shaft 37, shown in a conventional manner in full lines in Figure 8, the opposite end of the shaft being enclosed in a removable cap 40. If found desirable the coupling 39 may be mounted on the opposite end of the shaft, as shown in dot and dash lines, and the cap applied to cover the opposite end of said shaft. The drive gear 36 is operatively connected to the driven gear 35 through an intermediate gear 41 meshing with gear 36 and an intermediate gear 42 meshing with gear 35, the gears 41, 42 being mounted on and rotatable with an intermediate shaft 43 journaled at the opposite ends in bearings 44 mounted in the top of the opposite end walls 16a, 16b of the support 16.

The gears and the drum trunnion 12' are enclosed by a hood 45 engaged over said gears and mounted on the support 16 to co-operate therewith to provide a housing. To provide a liquid tight joint between the inner end wall of the hood and the trunnion an annular plate 46 (Figure 1) bearing at the inner edge upon the trunnion with an interposed packing material, as at 46', is fixed at a peripheral portion to said inner end wall of the hood and to the inner side of the support 16, the portion of said plate below the axis of the trunnion in conjunction with the support forming a lubricant receiving chamber, as at 47, in communication with the well 16' in the support through a port 47'. The support 16 and the hood 45 is of a width greater than the length of the trunnion 12' and to provide a liquid tight connection between said trunnion and the outer end wall of the hood and arrange said end of the hood and support with an opening coaxially of the drum trunnion, the trunnion is provided with an extension 12'' and an annular collar 48 is mounted in a semicircular recess in the top of the outer wall 16b of the support 16 and secured thereto by lag screws extended through openings in an annular flange extending laterally from the outer end of the collar, as at 48', the outer end wall of the hood having a corresponding recess engaged by the collar, as at 48''. The inner end of the collar is flanged inwardly and bears upon the trunnion extension 12'' with an interposed packing material, as at 49. By this arrangement an opening is formed between the hood and support 16 coaxially of the drum trunnion adapted for the passage of a conduit, shown in dot and dash lines 50, connected to a sleeve 51 engaging in the trunnion and secured thereto by screws extended through openings in an annular flange extending laterally from the sleeve, as at 52, whereby the drum is adapted to be connected to means, such as a fan, to induce a flow of air into and from the drum with reduced material in suspension.

The lubricant in the well 16' of the support 16 is utilized to lubricate the trunnion 12' and its bearing 14 as well as the gearing and the bearings therefor. By the engagement of a peripheral portion of the gear 35 in the lubricant in the well 16' as said gear is rotated the lubricant is elevated above the axis of the trunnion by the surface contact and adhering of the lubricant to the sides of the gear. The lubricant is swept from one side of the gear 35, to the left as viewed in Figure 1, and distributed over the trunnion 12' onto the bearing 14 by a sweep 53 pivotally mounted in a support 54, similar to the sweep 31 and support 33, the sweep support 54 being mounted on a bracket 55 extended through an opening in and mounted on the inner end wall of the hood.

The lubricant is swept from the opposite side of the gear 35 by a sweep 56 pivotally carried by a bracket 57, similar to the sweep 31 and the bracket 33. The lubricant swept from the gear by the sweep 56 is delivered into a leader 58 suspended by brackets 59 from the top of the hood, as shown in Figure 7, the one end of the leader being disposed below the sweep 56 and inclining toward and terminating above the intermediate gear 41 whereby the lubricant will flow from the leader onto said gear. The lubricant directed onto the gear 41 is carried over onto the driving gear and the lubricant flowing from said latter gear accumulates in a pocket 60 arranged in the support 16 and in which pocket the gear 36 rotates. Likewise lubricant is carried over from the gear 35 onto the intermediate gear 42. The lubricant from gears 41, 42 flows onto the bearings 44 for the shaft 43 and from the gear 36 to the bearings 38 for the shaft 37. Also the lubricant directed onto the intermediate gear 41 by the leader 58 as it is carried over to the driving gear 36 and the lubricant carried over by the gear 35 onto the gear 42 splashes onto the end walls of the hood above the bearings 44 for the shaft 43 and the bearings 38 for the shaft 37, and said lubricant collects in V-shaped channel members 61 (Figures 5 and 6) fixed to the opposite end walls of the hood 45 above the bearings 38 and 44 for shafts 37 and 43, the channel members 61 having ports adapted to register with ports, as at 62, in the bearing walls and arranged to direct the lubricant onto said bearings. The lubricant in the chamber 16' in the support 16 is adapted to be cooled for which purpose a coil 63 (Figure 1) is disposed in the lubricant in the well 16', the ends of said coils being connected to pipes 64 (Figure 7) connected to a source of and with means to circulate a cooling medium through said coil. The support 16 is provided with a gauge 65 to indicate the depth of the lubricant in the well 16', and is also provided with access openings normally closed by closures, as shown at 66 in Figure 7.

Having described my invention, I claim:

1. In a support and lubricating means for tube mills including a horizontal axis drum having hollow axial trunnions to rotatably support the drum, a support arranged with a lubricant carrying well and a bearing rotatably engaged by a drum trunnion, said bearing being above the well, a hood mounted on the bearing support having an intermediate wall portion engaging above and spaced from the trunnion and end walls having a liquid tight bearing on the trunnion at the opposite ends of the bearing with the trunnion opening through the outer end wall, and said hood forming with the support a lubricant carrying housing in communication with the lubricant carrying well in the support, an annular member fixed concentrically on said drum trunnion in the housing with a peripheral portion engaging in the lubricant below the axis of the trunnion and the lubricant by the surface contact thereof with said member adapted to be elevated by the rotation of said member from below to above the axis of the trunnion, and a sweep pivotally mounted in the hood to engage the annular member and wipe lubricant from said member and distribute said lubricant onto the trunnion and bearing.

2. In a support and lubricating means for mills including a horizontal axis drum having hollow supporting trunnions at the opposite ends, a support having a lubricant carrying well therein, a bearing member for the rotatable engagement of a drum trunnion mounted on said support above the well in said support and arranged with a chamber having an inlet and an outlet adapted for connection of means to connect the chamber with a source of and circulate a cooling medium therethrough, a hood mounted on and forming with the support a lubricant carrying housing in communication with the well in the support, said hood being disposed above the trunnion and having a liquid tight bearing on the trunnion with the trunnion opening through the outer end wall of the hood, an annular member extending laterally from and rotatable with the trunnion having a peripheral portion engaged in the lubricant in the housing below the axis of the trunnion, the lubricant being elevated by said member from below the axis to above the axis of the trunnion by surface contact of the liquid with said member, and a sweep of channel shape in cross section pivotally mounted in the hood to engage the annular member above the axis of the trunnion and sweep lubricant from said member above the axis of the trunnion and the channel of the sweep directing said lubricant onto the trunnion and bearing member.

3. A support and lubricating means for tube mills including a horizontal axis drum having hollow supporting trunnions axially at the opposite ends, comprising a support arranged with a chamber open at the top and constituting a lubricant carrying well and having axially alined semicircular recesses extended into the top of the end walls, a bearing mounted in the recess in the inner end wall of the support adapted to be rotatably engaged by a drum trunnion, a hood engaged over the trunnion mounted on the support and having a recess in the outer end wall opposed to and forming with the recess in the outer end wall of the support a circular opening coaxially of said drum trunnion, an annular member secured to the inner end walls of the hood and support having a liquid tight bearing on the trunnion, a collar fixed to the hood and support and extended into said opening and having a liquid tight bearing at the inner end on the drum trunnion and adapted for the passage of a conduit connected to the trunnion, said collar in conjunction with the liquid tight bearing of the hood and support on the trunnion forming a housing in communication with the lubricant well in the support, a member fixed concentrically on the trunnion within said housing with a peripheral portion at all times engaging in the lubricant in the well and adapted by the rotation thereof with the drum to elevate lubricant from said well by surface contact of the lubricant therewith to above the axis of the trunnion, and a sweep pivotally mounted on the housing above the trunnion operative to sweep lubricant from said member and direct said lubricant onto the trunnion and trunnion bearing.

4. In a support and lubricating means for tube mills including a horizontal axis drum having hollow supporting trunnions axially at the opposite ends, a support having a chamber therein open at the top and constituting a lubricant carrying well and having axially alined semicircular recesses extended into the top of the end walls thereof, a bearing mounted in the recess in the inner end wall of the support adapted to be rotatably engaged by a drum trunnion, a hood engaged over the trunnion mounted on the support, the outer end wall of said hood having a recess therein opposed to and forming with the recess in the outer end wall of the support a circular opening coaxially of said drum trunnion, a collar extended into said opening fixed to the hood and support and having a liquid tight connection with the trunnion, an annular plate fixed to the inner side wall of the hood and support having a liquid tight bearing on the trunnion, said plate and collar in conjunction with the hood and support forming a housing in communication with the lubricant well in the support, a gear fixed concentrically on the trunnion within said housing with a peripheral portion at all times engaging in the lubricant in the well of the support and adapted by the rotation thereof with the drum to elevate lubricant from said well by surface contact of the lubricant with the gear to above the axis of the trunnion, and a sweep pivotally mounted in the housing above the trunnion operative to engage the gear and sweep lubricant from the gear and direct said lubricant onto the trunnion and trunnion bearing.

5. In a support and lubricating means for tube mills including a horizontal axis drum having hollow supporting trunnions axially at the opposite ends, a support arranged with a chamber therein open at the top and constituting a lubricant carrying well and having a semicircular bearing in the top of the inner end wall adapted to be rotatably engaged by a drum trunnion and a semicircular recess in the outer end wall axially of the bearing, a gear fixed concentrically on the trunnion engaging said bearing with a peripheral portion of the gear engaging in the lubricant in the well of the support and operative by the rotation thereof to elevate lubricant by surface contact thereof with the gear from said well to above the axis of rotation of said gear, a driving gear and intermediate gears journaled in the end walls of said support rotatable in the chamber in the support the intermediate gears meshing with and connecting the driving gear and the gear fixed on the trunnion to each other, a hood engaged over the gears and trunnion mounted on the support having a recess in the outer wall opposed to and forming with the recess in the outer wall of the support an opening coaxially of said drum trunnion, an annular member secured to the inner wall of said hood and side of the support having a liquid tight bearing on the trunnion, a collar fixed to the hood and support extended into said opening and having a liquid tight bearing on the trunnion, said annular member and collar in conjunction with the hood and support forming a housing for the gears and said trunnion, and a channel shaped plate pivotally mounted in the hood above the axis of rotation of the gear on the trunnion and adapted to engage and sweep lubricant from said gear and the channel of the plate directing said lubricant onto the driving and intermediate gears and their bearings and onto the trunnion and trunnion bearing.

JOSEPH E. KENNEDY.